(12) United States Patent
Joschko et al.

(10) Patent No.: US 11,451,045 B2
(45) Date of Patent: Sep. 20, 2022

(54) AUTOMOTIVE AUXILIARY UNIT WITH AN ELECTRONIC PROTECTION UNIT

(71) Applicant: PIERBURG PUMP TECHNOLOGY GMBH, Neuss (DE)

(72) Inventors: Witold Joschko, Kempen (DE); Stephan Riefers, Krefeld (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 16/966,903

(22) PCT Filed: Feb. 5, 2018

(86) PCT No.: PCT/EP2018/052771
§ 371 (c)(1),
(2) Date: Aug. 3, 2020

(87) PCT Pub. No.: WO2019/149378
PCT Pub. Date: Aug. 8, 2019

(65) Prior Publication Data
US 2021/0050717 A1    Feb. 18, 2021

(51) Int. Cl.
*H02H 3/00*    (2006.01)
*H02H 7/00*    (2006.01)
*H02H 9/02*    (2006.01)
*H02H 3/08*    (2006.01)

(52) U.S. Cl.
CPC .................................. *H02H 3/08* (2013.01)

(58) Field of Classification Search
CPC ....... H02H 3/08; H02H 11/002; H02H 3/0935

USPC ......................................................... 361/100
See application file for complete search history.

(56) References Cited

U.S. PATENT DOCUMENTS

| | | | |
|---|---|---|---|
| 3,571,608 A * | 3/1971 | Hurd, III ................. | H02H 9/02 361/77 |
| 4,429,339 A * | 1/1984 | Jaeschke ............ | H03K 17/0822 361/93.7 |
| 6,611,410 B1 | 8/2003 | Makaran | |
| 9,041,244 B2 * | 5/2015 | Graf ....................... | B60R 16/03 307/10.7 |
| 2010/0231257 A1 * | 9/2010 | Baddela ................. | H03K 17/18 326/62 |
| 2017/0134017 A1 | 5/2017 | Dela Cruz et al. | |
| 2017/0163033 A1 | 6/2017 | Jang et al. | |
| 2018/0358798 A1 * | 12/2018 | Kadoya .................... | H02H 3/05 |

FOREIGN PATENT DOCUMENTS

| | | |
|---|---|---|
| CN | 101860021 A | 10/2010 |
| CN | 107395175 A | 11/2017 |
| FR | 2 634 601 A1 | 1/1990 |
| JP | 2013-255017 A | 12/2013 |
| WO | WO 2013/104489 A1 | 7/2013 |

\* cited by examiner

*Primary Examiner* — Jared Fureman
*Assistant Examiner* — Lucy M Thomas
(74) *Attorney, Agent, or Firm* — Norman B. Thot

(57) ABSTRACT

An automotive auxiliary unit includes an electronic protection unit. The electronic protection unit includes an inverse-polarity protection unit having a semiconductor switch, and an overcurrent protection unit which detects a voltage drop at the semiconductor switch of the inverse-polarity protection unit so as to determine a present current level.

2 Claims, 1 Drawing Sheet

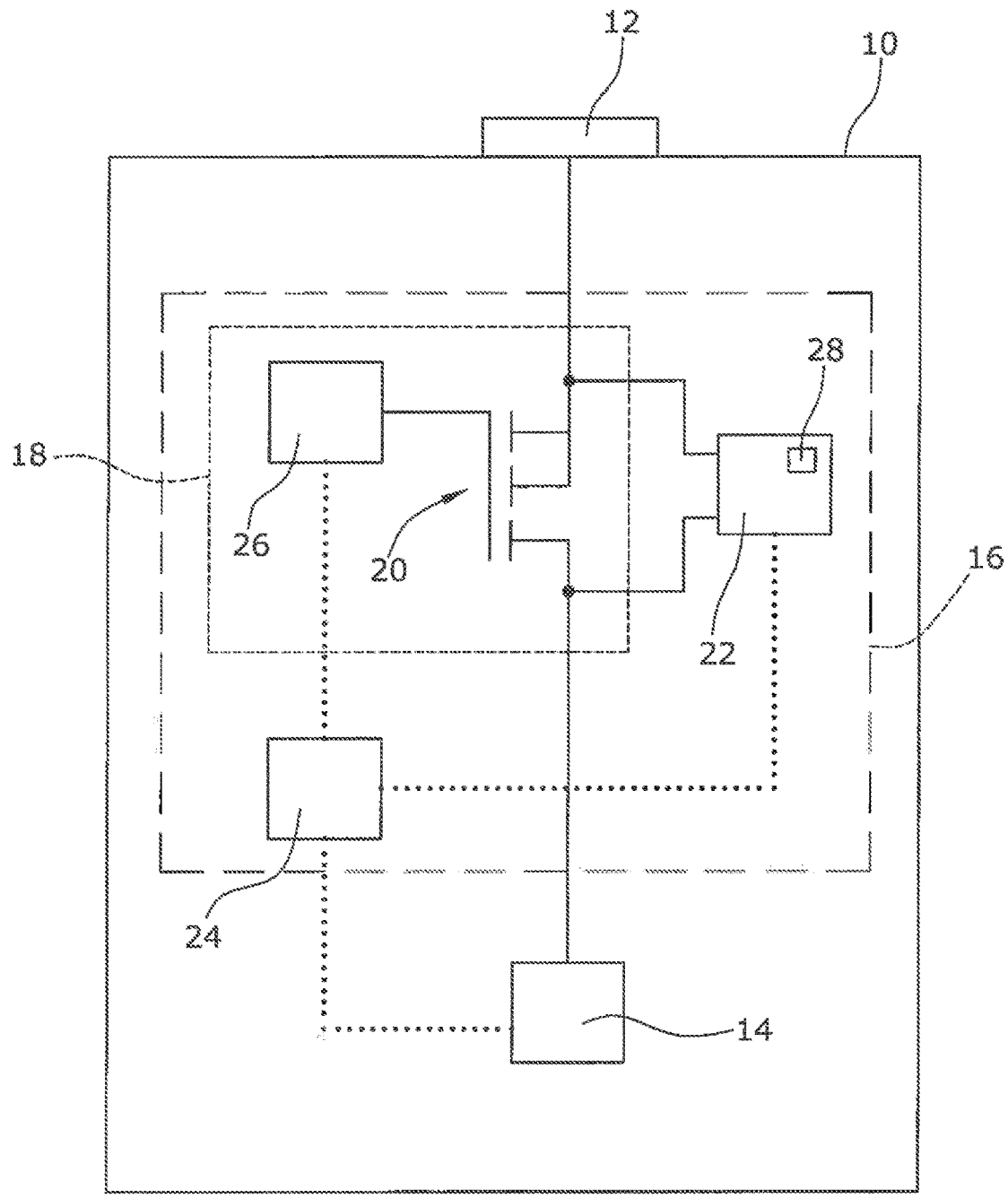

AUTOMOTIVE AUXILIARY UNIT WITH AN ELECTRONIC PROTECTION UNIT

CROSS REFERENCE TO PRIOR APPLICATIONS

This application is a U.S. National Phase application under 35 U.S.C. § 371 of International Application No. PCT/EP2018/052771, filed on Feb. 5, 2018. The International Application was published in English on Aug. 8, 2019 as WO 2019/149378 A1 under PCT Article 21(2).

FIELD

The present invention is directed to an automotive auxiliary unit with an electronic protection unit comprising an inverse-polarity protection unit and an overcurrent protection unit.

BACKGROUND

Automotive auxiliary units are commonly provided with an inverse-polarity protection unit and a separate overcurrent protection unit.

The inverse-polarity protection unit avoids supplying inverse-polarity supply voltages to an electric component of the auxiliary unit. The inverse-polarity supply voltage may cause a malfunction of the automotive auxiliary unit or may damage the electric component. Inverse-polarity protection units commonly comprise a semiconductor switch which is arranged in the electric feed line of the electric component. The semiconductor switch is highly-conductive for normal-polarity supply voltages and is substantially non-conductive for inverse-polarity supply voltages. Such an inverse-polarity protection unit is described, for example, in U.S. Pat. No. 6,611,410 B1.

The overcurrent protection unit avoids providing an overcurrent to an electric component of the auxiliary unit. The term "overcurrent" in this context means any electric current with a higher current level than a specified maximum current level. Electronic components are in particular very sensitive to an overcurrent and may be damaged when being provided with an electric current which is too high. Overcurrent protection units commonly comprise a sense resistor with a low and well-defined electric resistance being electrically connected in series with the electric component. The voltage drop at the sense resistor is evaluated to determine the present current level of the electric current passing the sense resistor, and thereby to determine the current level being provided to the electric component. Such an overcurrent protection unit is described, for example, in US 2017/0134017 A1.

SUMMARY

An aspect of the present invention is to provide a compact and cost-efficient automotive auxiliary unit with an inverse-polarity protection and with an overcurrent protection.

In an embodiment, the present invention provides an automotive auxiliary unit comprising an electronic protection unit. The electronic protection unit comprises an inverse-polarity protection unit which comprises a semiconductor switch, and an overcurrent protection unit which is configured to detect a voltage drop at the semiconductor switch of the inverse-polarity protection unit so as to determine a present current level.

BRIEF DESCRIPTION OF THE DRAWING

The present invention is described in greater detail below on the basis of embodiments and of the drawing in which:

The FIGURE shows a schematic representation of an automotive auxiliary unit with an electronic protection unit according to the present invention.

DETAILED DESCRIPTION

The automotive auxiliary unit according to the present invention is provided with an inverse polarity protection unit comprising a semiconductor switch. The semiconductor switch provides a high electric conductance in case of normal-polarity supply voltages, and provides a negligible electric conductance in case of inverse-polarity supply voltages. The semiconductor switch is arranged in the electric feed line of an electric component so that an energization of the electric component is avoided in case of an inverse-polarity supply voltage. The semiconductor switch can, for example, be arranged in the electric feed line of a motor control unit or can be arranged between the motor control unit and an electromagnetic coil of an electric motor.

The automotive auxiliary unit according to the present invention is also provided with an overcurrent protection unit which is electrically connected with the semiconductor switch of the inverse-polarity protection unit. The overcurrent protection unit detects and evaluates the voltage drop at the semiconductor switch to determine the present current level of the electric current passing the semiconductor switch, and thereby to determine the feed current of the electric component. This allows an overcurrent protection for the electric component to be provided without requiring any additional sense resistor or other current sensing element. The automotive auxiliary unit according to the present invention can therefore be provided as very compact and cost-efficient.

In an embodiment of the present invention, the semiconductor switch can, for example, be a MOSFET. MOSFETs have a very high electric conductance when being provided with a forward bias voltage, and have very low electric conductance when being provided with an inverse bias voltage. MOSFETs are also cost-efficient and can be easily integrated onto circuit boards of automotive auxiliary unit electronics.

An embodiment of the present invention is described with reference to the FIGURE which shows a schematic representation of an automotive auxiliary unit with an electronic protection unit according to the present invention.

The FIGURE shows an automotive auxiliary unit 10, for example, a coolant pump or a lubricant pump of a motor vehicle. The automotive auxiliary unit 10 comprises a power supply terminal 12, an electronics unit 14, and an electronic protection unit 16 which is electrically connected in series with the power supply terminal 12 and with the electronics unit 14.

The electronic protection unit 16 comprises an inverse-polarity protection unit 18 with a semiconductor switch 20, an overcurrent protection unit 22, and a protection control unit 24.

In the present embodiment of the present invention, the semiconductor switch 20 is a MOSFET. The input of the semiconductor switch 20 is electrically connected with the power supply terminal 12, the output of the semiconductor switch 20 is electrically connected with the electronics unit 14, and the control terminal of the semiconductor switch 20 is electrically connected with an inverse-polarity protection control unit 26. If the power supply terminal 12 is provided with a positive supply voltage, the semiconductor switch 20 is provided with a forward bias voltage so that the semiconductor switch 20 is highly conductive. If the power supply terminal 12 is provided with a negative supply voltage, the semiconductor switch 20 is provided with an inverse bias voltage so that the semiconductor switch 20 is substantially non-conductive.

The overcurrent protection unit 22 is electrically connected with the input of the semiconductor switch 20 and with the output of the semiconductor switch 20 to detect the voltage drop at the semiconductor switch 20. The overcurrent protection unit 22 is provided with an overcurrent protection evaluation unit 28 which evaluates the detected voltage drop to determine the present current level passing the semiconductor switch 20 and feeding the electronics unit 14.

The protection control unit 24 is connected with the inverse-polarity protection control unit 26 and with the overcurrent protection unit 22 via signal lines. The overcurrent protection unit 22 provides an overcurrent signal to the protection control unit 24 in the case of an overcurrent event. As a result, the protection control unit 24 in turn provides an interrupt signal to the inverse-polarity protection control unit 26 which then switches off the semiconductor switch 20 to interrupt the electric connection between the power supply terminal 12 and the electronics unit 14.

The present invention is not limited to embodiments described herein; reference should be had to the appended claims.

LIST OF REFERENCE NUMERALS

10 Automotive auxiliary unit
12 Power supply terminal
14 Electronics unit
16 Electronic protection unit
18 Inverse-polarity protection unit
20 Semiconductor switch
22 Overcurrent protection unit
24 Protection control unit
26 Inverse-polarity protection control unit
28 Overcurrent protection evaluation unit

What is claimed is:

1. An automotive auxiliary unit comprising an electronic protection unit, the electronic protection unit comprising:
an inverse-polarity protection unit comprising a semiconductor switch which comprises an input and an output;
an overcurrent protection unit which is configured to detect a voltage drop at the semiconductor switch of the inverse-polarity protection unit so as to determine a present current level and to provide an overcurrent signal if the present current level is higher than a specified maximum current level, the overcurrent protection unit being directly electrically connected with the input of the semiconductor switch and directly electrically connected with the output of the semiconductor switch; and
a protection control unit which is configured to switch the semiconductor switch of the inverse-polarity protection unit off if the overcurrent protection unit provides the overcurrent signal.

2. The automotive auxiliary unit as recited in claim 1, wherein the semiconductor switch is a MOSFET.

\* \* \* \* \*